(12) United States Patent
Kim

(10) Patent No.: US 9,070,277 B2
(45) Date of Patent: Jun. 30, 2015

(54) METER CAPABLE OF HAVING COMMUNICATION SECURITY AND DATA TRANSMITTING/RECEIVING SYSTEM USING THE SAME

(71) Applicant: LSIS CO., LTD., Anyang-si,Gyeonggi-do (KR)

(72) Inventor: Yong Woo Kim, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 142 days.

(21) Appl. No.: 13/712,523

(22) Filed: Dec. 12, 2012

(65) Prior Publication Data

US 2013/0154848 A1 Jun. 20, 2013

(30) Foreign Application Priority Data

Dec. 19, 2011 (KR) ........................ 10-2011-0137309

(51) Int. Cl.
| | |
|---|---|
| *G06F 21/31* | (2013.01) |
| *G08C 19/00* | (2006.01) |
| *H04L 29/06* | (2006.01) |
| *H04L 29/08* | (2006.01) |

(52) U.S. Cl.
CPC ............ *G08C 19/00* (2013.01); *H04L 63/0442* (2013.01); *H04L 67/12* (2013.01)

(58) Field of Classification Search
CPC ....................................................... G06F 21/31
USPC .................... 340/539.1, 539.11, 506
See application file for complete search history.

(56) References Cited

U.S. PATENT DOCUMENTS

| | | | |
|---|---|---|---|
| 2003/0074445 A1* | 4/2003 | Roach et al. .................. | 709/224 |
| 2006/0206433 A1 | 9/2006 | Scoggins | |
| 2006/0271244 A1 | 11/2006 | Cumming et al. | |

FOREIGN PATENT DOCUMENTS

| | | |
|---|---|---|
| CN | 102216735 | 10/2011 |
| KR | 10-2010-0053900 | 5/2010 |
| KR | 10-2011-0100598 | 9/2011 |

OTHER PUBLICATIONS

Korean Intellectual Property Office Application Serial No. 10-2011-0137309, Office Action dated Jan. 19, 2015, 4 pages.
Shi, et al., "Network remote automatic meter reading system based on DLMS/COSEM," Electrical Measurement & Instrumentation, vol. 45, No. 509, May 2008, 5 pages.
Yang, et al., "The Design and Realization of Embedded AMR Concentrator Based on DLMS/COSEM," Computing Technology and Automation, vol. 30, No. 2, Jun. 2011, 4 pages.
The State Intellectual Property Office of the People's Republic of China Application Serial No. 201210599054.5, Office Action dated Mar. 12, 2015, 8 pages.

* cited by examiner

*Primary Examiner* — Daryl Pope
(74) *Attorney, Agent, or Firm* — Lee, Hong, Degerman, Kang & Waimey

(57) ABSTRACT

Disclosed is a meter capable of having communication security and a data transmitting/receiving system using the same, the system being such that a the server generates a public key and a private key corresponding to the public key, and transmits the public key to a meter, and the meter comprises a communication unit receiving the public key from a first communication unit, a frame generating unit encoding the data frame using the public key, and a controller controlling the communication unit to allow transmitting the encoded data frame.

5 Claims, 3 Drawing Sheets

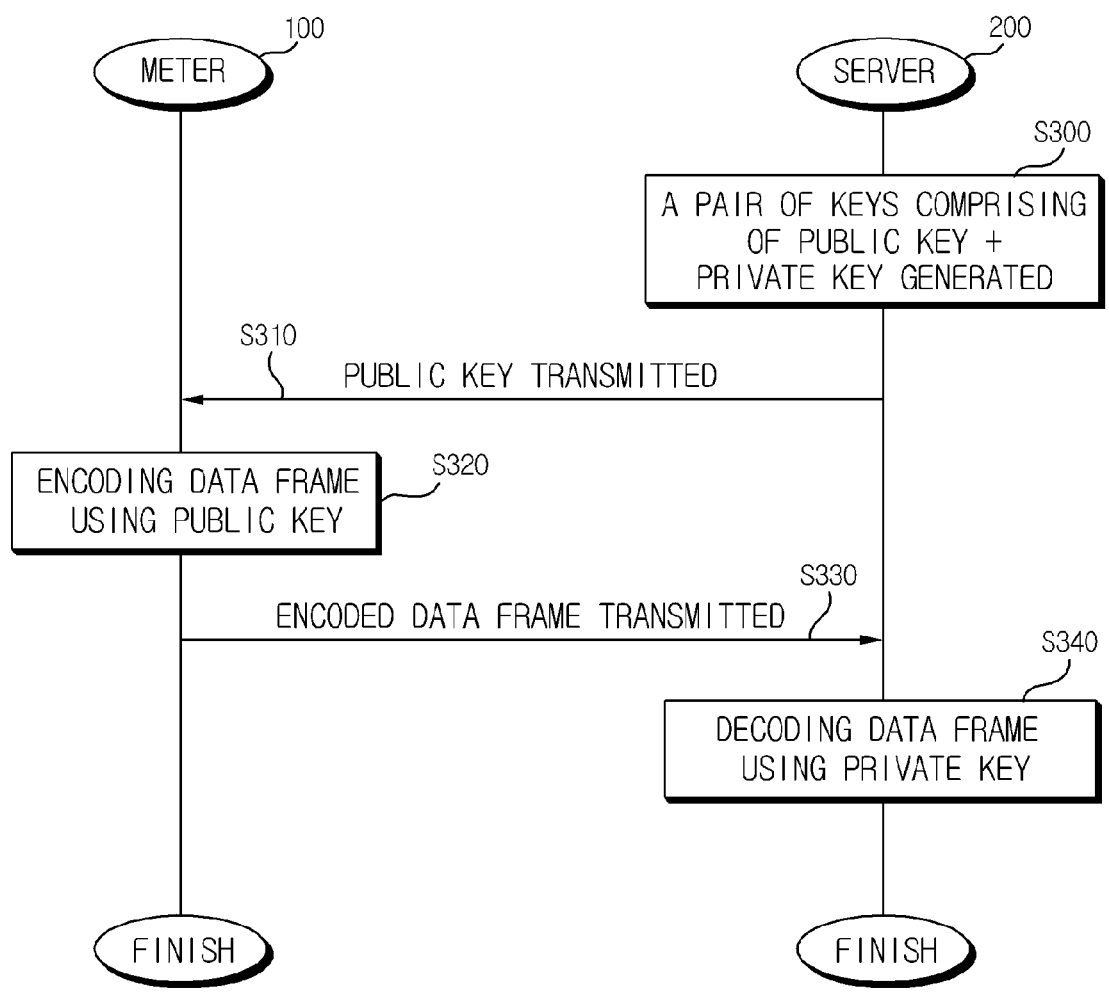

METER CAPABLE OF HAVING COMMUNICATION SECURITY AND DATA TRANSMITTING/RECEIVING SYSTEM USING THE SAME

CROSS-REFERENCE TO RELATED APPLICATIONS

Pursuant to 35 U.S.C. §119 (a), this application claims the benefit of earlier filing date and right of priority to Korean Patent Application No. 10-2011-0137309, filed on Dec. 19, 2011, the contents of which are hereby incorporated by reference herein in their entirety.

BACKGROUND OF THE INVENTION

1. Field of the Invention

The present disclosure relates to a meter capable of having communication security and a data transmitting/receiving system using the same.

2. Description of Related Art

This section provides background information related to the present disclosure which is not necessarily prior art.

Generally, a currently-used electronic watt hour meter (abbreviated as 'meter') performs communication using a DLMS (Device Language Message Specification) protocol, which is an International Communication Protocol specification, for remote metering with reference to spread of the electronic watt hour meter. In a case the DLMS protocol is used between the meter and a server of an electric power company, information of the meter can be promptly read through an Obis (Object Identification System) code, where the Obis code is defined by a data object of the meter.

The Obis code is comprised of several dozens to several hundreds of objects, where each Obis code performs and expresses different functions and information in response to a command of a user calling a DLMS communication. A server and a meter exchanges Hex (Hexadecimal number) frames and data, a conventional art related thereto is illustrated in FIG. 1.

FIG. 1 is an exemplary view illustrating a communication between a server and a meter according to prior art.

First of all, a server (20) transmits a Hex frame (30) to a meter (10) to obtain desired data or desired information. However, '7E' must be arranged at an extreme front and an extreme end of the Hex frame (30) in order to use a DLMS communication, and a structure such as a head forming the frame (30) is included between the 7Es. That is, an International Communication Protocol stipulates the DLMS communication rule be followed in communication between the server and the meter according to prior art, whereby no communication is realized between the server and the meter if the rule is not properly observed.

Particularly, one of the Obis codes called a load profile possesses essential information of the currently used meter which allows a user or a manager to easily learn the information.

However, the prior art suffers from disadvantages in that security-related problems such as the manipulation and changing of data through a communication line between the electronic watt hour meter and a remote metering apparatus.

In other words, all of the data transmitted and received using the DLMS protocol includes raw data capable of being analyzed without performing a separate processing thereon. As a result, the existing electronic watt hour meter is weak in terms of security, since the raw data may be manipulated and changed through intervention in a communication line between the meter and the remote metering apparatus for a malicious purpose. Thus, a measure to reinforce the security of the meter must be provided as soon as possible.

SUMMARY OF THE INVENTION

This section provides a general summary of the disclosure, and is not a comprehensive disclosure of its full scope or all of its features.

Exemplary aspects of the present disclosure are to substantially solve at least the above problems and/or disadvantages and to provide at least the advantages below.

The present disclosure is directed to provide a meter capable of having communication security that enables prevention of misuse by an outsider through reinforced security in data communication, and a data transmitting/receiving system using the same.

Technical problems to be solved by the present disclosure are not restricted to the above-mentioned descriptions, and any other technical problems not mentioned so far will be clearly appreciated from the following description by skilled in the art.

In one general aspect of the present invention, there is provided a meter capable of having communication security (hereinafter referred to as "meter"), the meter comprising: a communication unit communicating with a server; a frame generating unit encoding a data frame using a public key received from the server via the communication unit; and a controller controlling the communication unit to allow transmitting the encoded data frame, in a case a message requesting the data frame from the server.

Preferably, but not necessarily, the communication unit may communicate with the server using the DLMS protocol.

Preferably, but not necessarily, the server may have a private key corresponding to the public key.

Preferably, but not necessarily, the communication unit may simultaneously receive the public key and a message requesting the data frame from the server.

Preferably, but not necessarily, the meter may further comprise a storage storing the encoded data frame.

Preferably, but not necessarily, the controller may control the communication unit to allow transmitting the encoded data frame stored in the storage, in a case a message requesting the data frame is received from the server.

Preferably, but not necessarily, the frame generating unit may encode a part indicating a data in the data frame.

In another general aspect of the present disclosure, there is provided a data transmitting/receiving system (hereinafter referred to as 'system') transmitting/receiving a data frame between a meter and a server, wherein the server generates a public key and a private key corresponding to the public key, and transmits the public key to the meter, and wherein the meter comprises a communication unit receiving the public key from the server, a frame generating unit encoding the data frame using the public key, and a controller controlling the communication unit to allow transmitting the encoded data frame.

Preferably, but not necessarily, the server may decode the encoded data frame received from the meter using the private key.

Preferably, but not necessarily, the server and the communication unit may communicate each other using a DLMS protocol.

Preferably, but not necessarily, the meter may further comprise storage storing the encoded data frame, and the controller may control the communication unit to allow transmitting the encoded data frame stored in the storage, in a case a message requesting the data frame is received from the server.

Preferably, but not necessarily, the controller may control the frame generating unit to generate a data frame using the public key received from the frame generating unit, in a case a message requesting the data frame and the public key is received from the server.

Preferably, but not necessarily, the frame generating unit may encode a part indicating a data in the data frame.

The present disclosure has an advantageous effect in that security during communication between a server and a meter can be reinforced to prevent a misuse or abnormal use by an outside.

BRIEF DESCRIPTION OF THE DRAWINGS

In the drawings, the width, length, thickness, etc. of components may be exaggerated or reduced for the sake of convenience and clarity. Furthermore, throughout the descriptions, the same reference numerals will be assigned to the same elements in the explanations of the figures, and explanations that duplicate one another will be omitted. Now, a voice coil motor according to the present disclosure will be described in detail with reference to the accompanying drawings.

The teachings of the present disclosure can be readily understood by considering the following detailed description in conjunction with the accompanying drawings, in which:

FIG. 3 is an exemplary view illustrating an operation of a data transmitting/receiving system according to an exemplary embodiment of the present disclosure.

DETAILED DESCRIPTION OF THE INVENTION

Advantages and features of the present disclosure may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. Accordingly, the described aspect is intended to embrace all such alterations, modifications, and variations that fall within the scope and novel idea of the present disclosure.

The meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Now, exemplary embodiments of the present disclosure will be explained in detail together with the figures.

Figure 2:
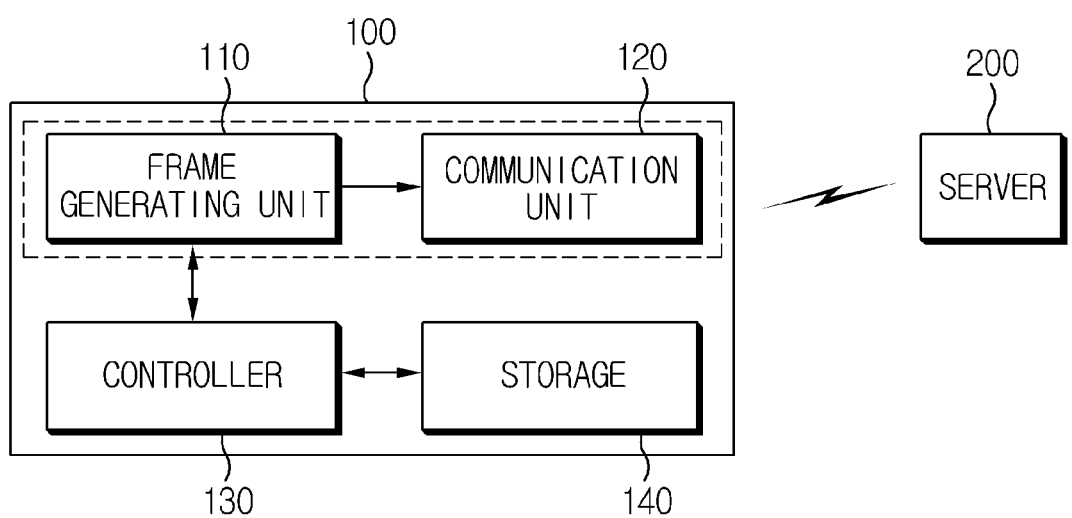
FIG. 2 is a block diagram illustrating a meter according to an exemplary embodiment of the present disclosure.

FIG. 2 is a block diagram illustrating a meter according to an exemplary embodiment of the present disclosure.

Referring to FIG. 2, a meter (100) according to an exemplary embodiment of the present disclosure comprises a frame generating unit (110), a communication unit (120), a controller (130) and storage (140).

The meter (100) and a server (200) wirelessly communicate through the communication unit (120), and, as a non-limiting example, may transmit/receive data using a DLMS (Device Language Message Specification) protocol. However, the present disclosure is not limited thereto, and other various communication protocols may be applied thereto.

The frame generating unit (110) encodes (encrypts) the data frame using the public key received from the server (200) via the communication unit (120). To be more specific, the meter (100) having received a request for a hex (hexadecimal number) frame from the server (200) forms a hex data frame in response to the DLMS protocol, and encodes the formed data frame using the public key received from the server (200).

A method sharing the public key with the meter (100) and the server (200) may be variably set. That is, by way of non-limiting example, in a case the server (200) reads meter reading information (hereafter referred to as "data") from the meter (100), the server (200) can transmit to the meter (100) the kinds of data to be read, using the Obis code, and at this time, the server (200) can transmit the public key simultaneously.

Alternatively, each meter is generated with intrinsic public key and private key during designing of the meter (100), and the public key is stored in advance in a meter program and the private key is advised to the server (200). Furthermore, a program may be updated at every particular period in preparation for security and the public key may be changed. However, this method is just an example and the present disclosure is not limited thereto.

Figure 1:
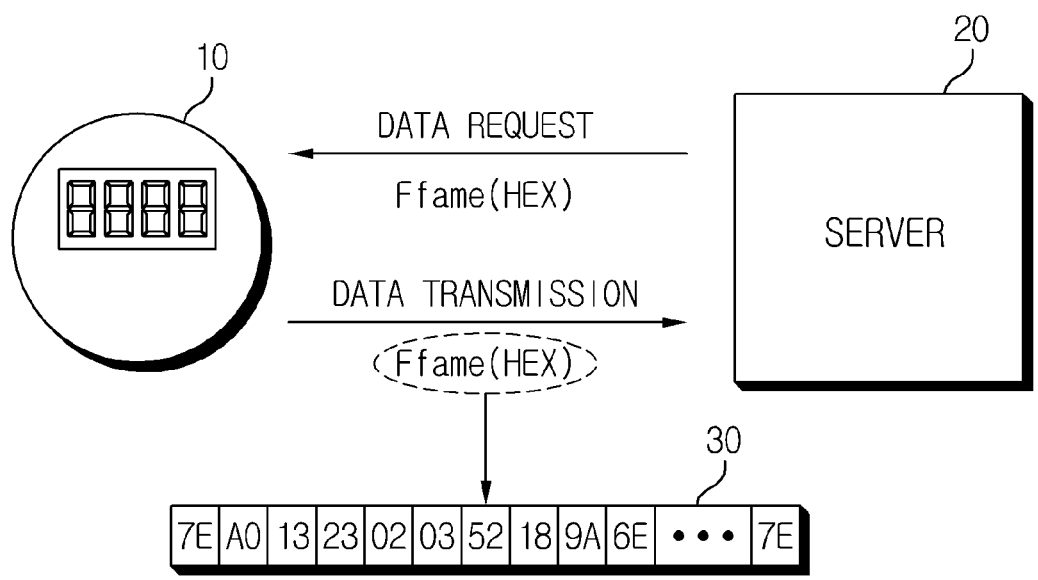
FIG. 1 is an exemplary view illustrating a communication between a server and a meter according to prior art.

Meanwhile, there may be a method of encoding all the data from the front 7E to the end 7E in the DLMS frame (30) of FIG. 1, only a block portion indicating a data inside the DLMS frame (30), instead of an entire DLMS frame (30), may be encoded.

The communication unit (120) transmits the encoded data frame generated by the frame generating unit (110) to the server (200). Although the communication unit (120) may directly receive the encoded data frame generated by the frame generating unit (110) and transmit the encoded data frame to the server (200), the communication unit (120) may also transmit the encoded data frame stored in the storage (140) to the server (200). The communication unit (120) may transmit/receive the data using the DLMS protocol, for example.

Furthermore, the communication unit (120), with regard to sharing of public key and private key, receives the public key from the server (200), which is a case where the server (200) generates a pair of public key and private key, and transmits the public key to the meter (100). Furthermore, the communication unit (120) may receive a message requesting information data of the meter (100) from the server (200).

The controller (130) controls an overall operation of the meter (100). First, the controller (130) may control the frame generating unit (110) to allow the data to be encoded using the public key received from the server (200). Furthermore, the controller (130) may also control the frame generating unit (110) to allow the data frame encoded by the frame generating unit (110) to be transmitted to the server (200). Meanwhile, the controller (130) may store the data frame encoded by the frame generating unit (110) in the storage (140) and read the encoded data frame stored in the storage (140) to allow the communication unit (120) to transmit the data frame to the server (200).

The storage (140) may store the encoded data frame. Although the storage (140) may temporarily store the encoded data frame, there is no limit in storage period. In a case there is a request from the server (200), the storage (140) may transmit the stored and encoded data frame to the server (200) via the communication unit (120).

The server (200) may approach a relevant data by decoding (decrypting) the data frame transmitted from the meter (100), i.e., the data frame encoded by using the public key, using a private key corresponding to the public key.

Thus, the security can be reinforced by transmitting/receiving the encoded data frame using the public key and the private key between the meter (100) and the server (200), thereby prevent crime that may be created by unlawfully accessing and intercepting information from outside.

FIG. 3 is an exemplary view illustrating an operation of a data transmitting/receiving system according to an exemplary embodiment of the present disclosure.

First of all, the server (200) generates a pair of keys including a public key and a private key (S300). The public key and the private key are the keys capable of encoding and decoding information data of the meter (100).

To be more specific, the public key is used when encoding the information data of the meter (100) and the private key is used when decoding the information data encoded by the public key. The information data encoded by the public key can be decoded only by the private key corresponding to the public key, and therefore, only the person having the private key can access the encoded data to thereby realize the security. There are many methods in regard to encoding/decoding methods using the public key and private key, no more explanation will be provided thereto.

The server (200) having generated a pair of keys may transmit the public key to the meter (100). The transmission of public key may be performed between the meter (100) and the server (200) using the DLMS communication. Meanwhile, the server (200) may simultaneously transmit a message requesting the information data to the meter (100) and the public key at the same time.

The meter (100) having received the public key encodes the data frame using the public key (S320). The meter (100) may re-transmit the data frame encoded by using the public key to the server (200) using the DLMS communication (S330).

Last, the server (200) may decode the data frame received from the meter (100) using the private key (S340). Thus, the security can be reinforced by transmitting/receiving the encoded data frame using the public key/private key between the meter (100) and the server (200), thereby prevent crime that may be created by unlawfully accessing and intercepting information from outside.

Meanwhile, instead of generating, by the server (200), the public key and the private key, the public key may be stored in the meter (100) in advance during manufacturing of the meter (100) to allow the server (200) to possess the private key in advance.

The above-mentioned a meter capable of having communication security and a data transmitting/receiving system using the same according to the present disclosure may, however, be embodied in many different forms and should not be construed as limited to the embodiment set forth herein. Thus, it is intended that embodiment of the present disclosure may cover the modifications and variations of this disclosure provided they come within the scope of the appended claims and their equivalents. While particular features or aspects may have been disclosed with respect to several embodiments, such features or aspects may be selectively combined with one or more other features and/or aspects of other embodiments as may be desired.

What is claimed is:

1. A data transmitting/receiving system comprising a meter and a server, wherein:
the server is configured to:
    generate a public key and a private key corresponding to the public key; and
    transmit a message requesting a data frame and the public key at a same time to the meter; and
the meter comprises:
    a communication unit receiving the public key from the server,
    a frame generating unit encoding the data frame using the public key, and
    a controller configured to:
        cause the communication unit to transmit the encoded data frame; and
        cause the frame generating unit to generate the data frame using the public key in response to receiving the message and the public key from the server.

2. The system of claim 1, wherein the server uses the private key to decode the encoded data frame received from the meter.

3. The system of claim 1, wherein the server and the communication unit communicate with each other using a Device Language Message Specification (DLMS) protocol.

4. The system of claim 1, wherein:
the meter further comprises a storage storing the encoded data frame, and
the controller is further configured to cause the communication unit to transmit the encoded data frame stored in the storage in response to the message received from the server.

5. The system of claim 1, wherein the frame generating unit encodes a block portion indicating data in the data frame.

* * * * *